US009807022B2

(12) United States Patent
Agarwal

(10) Patent No.: US 9,807,022 B2
(45) Date of Patent: Oct. 31, 2017

(54) OPTIMUM UTILIZATION OF YELLOW TOKENS IN PACKET METERING

(71) Applicant: Ciena Corporation, Hanover, MD (US)

(72) Inventor: Shivam Agarwal, Allahabad (IN)

(73) Assignee: Ciena Corporation, Hanover, MD (US)

( * ) Notice: Subject to any disclaimer, the term of this patent is extended or adjusted under 35 U.S.C. 154(b) by 87 days.

(21) Appl. No.: 14/854,343

(22) Filed: Sep. 15, 2015

(65) Prior Publication Data

US 2017/0041236 A1    Feb. 9, 2017

(30) Foreign Application Priority Data

Aug. 4, 2015    (IN) .......................... 2385/DEL/2015

(51) Int. Cl.
| | | |
|---|---|---|
| *H04L 12/819* | (2013.01) | |
| *H04L 12/861* | (2013.01) | |
| *H04L 12/833* | (2013.01) | |
| *H04L 12/823* | (2013.01) | |

(52) U.S. Cl.
CPC ............ *H04L 47/215* (2013.01); *H04L 47/31* (2013.01); *H04L 47/32* (2013.01); *H04L 49/9084* (2013.01)

(58) Field of Classification Search
None
See application file for complete search history.

(56) References Cited

U.S. PATENT DOCUMENTS

| | | | | |
|---|---|---|---|---|
| 6,970,426 B1* | 11/2005 | Haddock | ................. | H04L 47/10 370/233 |
| 2010/0195504 A1* | 8/2010 | Nandagopal | ............ | H04L 47/10 370/235.1 |
| 2011/0158101 A1* | 6/2011 | Figueira | .................. | H04L 47/20 370/235.1 |
| 2012/0170450 A1* | 7/2012 | Alleyne | .................. | H04L 47/20 370/230 |

OTHER PUBLICATIONS

"Bridges and Bridged Networks," IEEE Standards Association.
"Ethernet Services Attributes Phase 2," MEF 10.2 Technical Specification, Oct. 27, 2009.
Haddock, Stephen, "Frame Metering in 802.1Q," Version 01, Jan. 15, 2013.
Aboul-Magd et al., "A Differentiated Service Two-Rate, Three-Color Marker with Efficient Handling of in-Profile Traffic," Network Working Group, Jul. 2015.

* cited by examiner

*Primary Examiner* — Tejis Daya
(74) *Attorney, Agent, or Firm* — Clements Bernard Walker PLLC; Christopher L. Bernard; Lawrence A. Baratta, Jr.

(57) ABSTRACT

Packet metering systems and methods optimize utilization of yellow or excess tokens. The packet metering method includes receiving a packet of size B in an interval; and marking a color of the packet as green for committed, yellow for excess, or red for discard, based on the size B, a current committed token bucket for the interval, a current excess token bucket, and an overflow counter used to preserve unused yellow tokens from previous intervals while preserving Excess Information Rate (EIR) and Excess Burst Size (EBS) for the interval.

17 Claims, 5 Drawing Sheets

OPTIMUM UTILIZATION OF YELLOW TOKENS IN PACKET METERING

CROSS-REFERENCE TO RELATED APPLICATION(S)

The present patent application/patent claims the benefit of priority of Indian Patent Application No. 2385/DEL/2015, filed on Aug. 4, 2015, and entitled "OPTIMUM UTILIZATION OF YELLOW TOKENS IN PACKET METERING," the contents of which are incorporated in full by reference herein.

FIELD OF THE DISCLOSURE

The present disclosure generally relates to networking systems and methods. More particularly, the present disclosure relates to optimization of yellow tokens in a packet metering algorithm.

BACKGROUND OF THE DISCLOSURE

Packet metering was introduced in IEEE 802.1ad-2005 with a Drop Eligible Indicator (DEI) and in IEEE 802.1Q-2011 with a Canonical Format Indicator (CFI) to allow for packet "color" (drop eligibility). A packet's color is different from its priority. Priority is an inherent characteristic of a packet, determined by the contents. Different priorities can be mapped to different traffic classes, queued in different queues, and do not need order to be maintained between packets of different priorities. Color, on the other hand, is not an inherent characteristic of a packet and is determined based on the arrival time at a meter relative to the history of arrival times of previous packets. Frames within a traffic class can be marked different colors. An exemplary three color system utilizes Green, Yellow, and Red. Green can be for committed packets, Yellow for excess packets, and Red for non-conformant (discard) packets which are discarded. One example metering algorithm is described in Internet Engineering Task Force (IETF) Request for Comments (RFC) 4115 (July 2005), "A Differentiated Service Two-Rate, Three-Color Marker with Efficient Handling of in-Profile Traffic," the contents of which are incorporated by reference. Note, the term packet can also reference a frame as described herein.

RFC 4115 defines the behavior of a meter in terms of its mode and two token buckets, C and E (Committed and Excess, respectively, note C=Green and E=Yellow), with the rates, CIR (Committed Information Rate) and EIR (Excess Information Rate), respectively, and maximum sizes CBS (Committed Burst Size) and EBS (Excess Burst Size). The token buckets C and E are initially (at time 0) full; i.e., the token count $T_c(0)$=CBS and $T_e(0)$=EBS. Thereafter, the token count $T_c$ is incremented by one CIR times per second (up to CBS), and the token count $T_e$ is incremented by one EIR times per second (up to EBS). For a "Differentiated Service Two-Rate, Three-Color Marker" complying RFC 4115, there can be a situation where traffic is busty in nature but under the metering limit (EIR) such that all traffic ingressing/coming is Ethernet Virtual Local Area Network (VLAN) Tagged with CFI set thus using EBS bucket only. Due to the bursty nature of traffic, this situation of long bursts can lead to dropped packets even though traffic is within metering limits. This drop of packets happens due to the unavailability of tokens because overflowed tokens from EBS were wasted.

BRIEF SUMMARY OF THE DISCLOSURE

In an exemplary embodiment, a packet metering method, implemented in a meter, to optimize utilization of yellow tokens includes receiving a packet of size B in an interval; and marking a color of the packet as green for committed, yellow for excess, or red for discard, based on the size B, a current committed token bucket for the interval, a current excess token bucket, and an overflow counter used to preserve unused yellow tokens from previous intervals while preserving Excess Information Rate (EIR) and Excess Burst Size (EBS) for the interval. The packet metering method can further include, subsequent to the marking, updating the current committed token bucket if the packet is green and the current excess token bucket if the packet is yellow. The packet metering method can further include at an end of the interval, updating the overflow counter if there are unused yellow tokens from the interval. The meter can be operating in a color-aware mode, and wherein the marking includes: when the packet is a green packet at time t, then if the current committed token bucket minus B is greater than 0, marking the packet as green, and decrementing the current committed token bucket by B; else if the current excess token bucket minus B is greater than or equal to 0, marking the packet as yellow, and decrementing the current excess token bucket by B; else if the current excess token bucket plus the overflow counter is greater than B and if the EBS is greater than or equal to B, marking the packet as yellow and decrementing the overflow counter by B minus the current excess token bucket and the current excess token bucket is set to 0; else marking the packet as red; when the packet is a yellow packet at time t, then if the current excess token bucket minus B is greater than 0, marking the packet as yellow, and decrementing the current excess token bucket by B; else if the current excess token bucket plus the overflow counter is greater than B and if the EBS is greater than or equal to B, marking the packet as yellow and decrementing the overflow counter by B minus the current excess token bucket and the current excess token bucket is set to 0; else marking the packet as red.

The meter can be operating in one of a color-aware mode and a color-blind mode, and wherein the marking includes if operating in the color-blind mode OR the packet is received as green AND B is less than or equal to the current committed token bucket, marking the packet as green, and decrementing the current committed token bucket by B; if operating in the color-blind mode OR the packet is received as NOT red AND B is less than or equal to the current excess token bucket, marking the packet as yellow, and decrementing the current excess token bucket by B; and if operating in the color-blind mode OR the packet is received as NOT red AND B is less than or equal to the current excess token bucket plus the overflow counter AND B is less than or equal to the EBS, marking the packet as yellow, decrementing the overflow counter by B minus the current excess token bucket, and setting the current excess token bucket to zero. The packet metering method can further include forwarding the packet is the color is green or yellow and discarding the packet if the color is red. The receiving and the marking can be performed pursuant to Request for Comments (RFC) 4115 (July 2005). The receiving and the marking can be performed pursuant to Metro Ethernet Forum (MEF) Technical Specification (TS) 10.2 Ethernet Services Attributes Phase 2 (October 2009).

In another exemplary embodiment, a packet metering circuit configured to optimize utilization of yellow tokens includes circuitry configured to receive a packet of size B in an interval; and a meter, implemented in circuitry, configured to mark a color of the packet as green for committed, yellow for excess, or red for discard, based on the size B, a current committed token bucket for the interval, a current excess token bucket, and an overflow counter used to preserve unused yellow tokens from previous intervals while preserving Excess Information Rate (EIR) and Excess Burst Size (EBS) for the interval. The meter can be further configured to, subsequent to the packet being marked, update the current committed token bucket if the packet is green and the current excess token bucket if the packet is yellow. The meter can be further configured to, at an end of the interval, update the overflow counter if there are unused yellow tokens from the interval. The meter can be operating in a color-aware mode, and wherein the meter is configured to when the packet is a green packet at time t, then if the current committed token bucket minus B is greater than 0, mark the packet as green, and decrement the current committed token bucket by B; else if the current excess token bucket minus B is greater than or equal to 0, mark the packet as yellow, and decrement the current excess token bucket by B; else if the current excess token bucket plus the overflow counter is greater than B and if the EBS is greater than or equal to B, mark the packet as yellow and decrement the overflow counter by B minus the current excess token bucket and the current excess token bucket is set to 0; else mark the packet as red; when the packet is a yellow packet at time t, then if the current excess token bucket minus B is greater than 0, mark the packet as yellow, and decrement the current excess token bucket by B; else if the current excess token bucket plus the overflow counter is greater than B and if the EBS is greater than or equal to B, mark the packet as yellow and decrement the overflow counter by B minus the current excess token bucket and the current excess token bucket is set to 0; else mark the packet as red.

The meter can be operating in one of a color-aware mode and a color-blind mode, and wherein the meter is configured to if operating in the color-blind mode OR the packet is received as green AND B is less than or equal to the current committed token bucket, mark the packet as green, and decrement the current committed token bucket by B; if operating in the color-blind mode OR the packet is received as NOT red AND B is less than or equal to the current excess token bucket, mark the packet as yellow, and decrement the current excess token bucket by B; and if operating in the color-blind mode OR the packet is received as NOT red AND B is less than or equal to the current excess token bucket plus the overflow counter AND B is less than or equal to the EBS, mark the packet as yellow, decrement the overflow counter by B minus the current excess token bucket, and set the current excess token bucket to zero. The packet metering circuit can further include forwarding circuitry configured to forward the packet if the color is green or yellow and discard the packet if the color is red. The meter can operate pursuant to Request for Comments (RFC) 4115 (July 2005). The meter can operate pursuant to Metro Ethernet Forum (MEF) Technical Specification (TS) 10.2 Ethernet Services Attributes Phase 2 (October 2009).

In a further exemplary embodiment, a packet switch configured to optimize utilization of yellow tokens includes one more line ports; and a meter configured to, responsive to receipt of a packet of size B in an interval, mark a color of the packet as green for committed, yellow for excess, or red for discard, based on the size B, a current committed token bucket for the interval, a current excess token bucket, and an overflow counter used to preserve unused yellow tokens from previous intervals while preserving Excess Information Rate (EIR) and Excess Burst Size (EBS) for the interval. The meter can be configured to, subsequent to the packet being marked, update the current committed token bucket if the packet is green and the current excess token bucket if the packet is yellow, and at an end of the interval, update the overflow counter if there are unused yellow tokens from the interval. The meter can be operating in a color-aware mode, and wherein the meter is configured to when the packet is a green packet at time t, then if the current committed token bucket minus B is greater than 0, mark the packet as green, and decrement the current committed token bucket by B; else if the current excess token bucket minus B is greater than or equal to 0, mark the packet as yellow, and decrement the current excess token bucket by B; else if the current excess token bucket plus the overflow counter is greater than B and if the EBS is greater than or equal to B, mark the packet as yellow and decrement the overflow counter by B minus the current excess token bucket and the current excess token bucket is set to 0; else mark the packet as red; when the packet is a yellow packet at time t, then if the current excess token bucket minus B is greater than 0, mark the packet as yellow, and decrement the current excess token bucket by B; else if the current excess token bucket plus the overflow counter is greater than B and if the EBS is greater than or equal to B, mark the packet as yellow and decrement the overflow counter by B minus the current excess token bucket and the current excess token bucket is set to 0; else mark the packet as red.

The meter can be operating in one of a color-aware mode and a color-blind mode, and wherein the meter is configured to if operating in the color-blind mode OR the packet is received as green AND B is less than or equal to the current committed token bucket, mark the packet as green, and decrement the current committed token bucket by B; if operating in the color-blind mode OR the packet is received as NOT red AND B is less than or equal to the current excess token bucket, mark the packet as yellow, and decrement the current excess token bucket by B; and if operating in the color-blind mode OR the packet is received as NOT red AND B is less than or equal to the current excess token bucket plus the overflow counter AND B is less than or equal to the EBS, mark the packet as yellow, decrement the overflow counter by B minus the current excess token bucket, and set the current excess token bucket to zero.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, yellow token optimization systems and methods are described. The systems and methods preserve unused overflow EIR tokens, which can also be referred to as yellow tokens, from an EBS bucket without negating EIR and EBS limits. Specifically, the systems and methods utilize an overflow counter that saves unused yellow tokens for use at a later time. The systems and methods improve end user value, providing the end user full bandwidth, deriving benefit from previously unused tokens thereby increasing throughput and henceforth reduced cost/bit. The systems and methods, with a given metering rate, provide more throughput when traffic is bursty. Also, the systems and methods are implementable and incorporable in existing metering logic, circuitry, hardware, etc.

Figure 1:
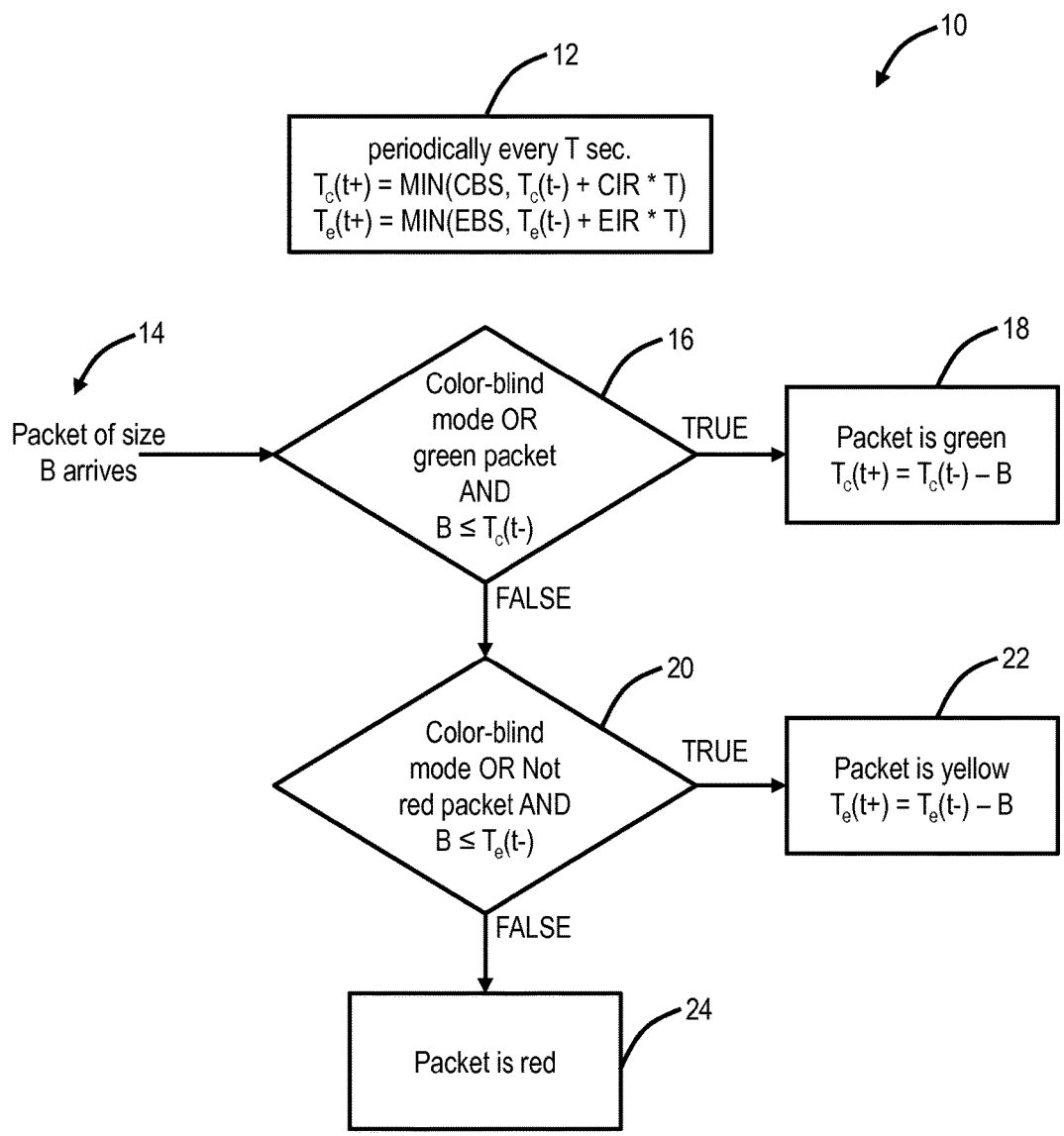
FIG. 1 is a flow chart of a conventional metering/marking process.

Referring to FIG. 1, conventionally, a flow chart illustrates a conventional metering/marking process 10. In color-aware operation, a meter can recognize the color of an incoming packet (green, yellow, or red), and implement the metering/marking process 10 accordingly. Again, the token buckets C and E are initially (at time 0) full; i.e., the token count $T_c(0)=CBS$ and $T_e(0)=EBS$. Thereafter, the token count $T_c$ is incremented by one CIR times per second (up to CBS), and the token count $T_e$ is incremented by one EIR times per second (up to EBS). When a green packet of size B arrives at time t, then if $T_c(t)-B>0$, the packet is green, and $T_c(t)$ is decremented by B; else if $T_e(t)-B>0$, the packet is yellow, and $T_e(t)$ is decremented by B; else the packet is red. When a yellow packet of size B arrives at time t, then if $T_e(t)-B>0$, the packet is yellow, and $T_e(t)$ is decremented by B; else the packet is red. Incoming red packets are not tested against any of the two token buckets and remain red.

The metering/marking process 10 includes, periodically every T secs, setting $$T_c(t+)=MIN(CBS, T_c(t-)+CIR*T)$$

$$T_e(t+)=MIN(EBS, T_e(t-)+EIR*T)$$

to set the associated token sizes (step 12). Now, for the metering/marking process 10, a packet of size B arrives (step 14). The metering/marking process 10 checks if the meter is in a color-blind mode OR the arriving packet of size B is a green packet AND $B \leq T_c(t-)$ (step 16), and if so (step 16 is true), the arriving packet is set as a green packet and $T_c(t+)=T_c(t-)-B$ (step 18). If step 16 is false, the metering/marking process 10 checks if the meter is in a color-blind mode OR that the arriving packet is not red packet AND $B \leq T_e(t-)$ (step 20). If step 20 is true, the arriving packet is yellow and $T_e(t+)=T_e(t-)-B$ (step 22). Otherwise, if step 20 is false, the arriving packet is yellow (step 24). Note, in FIG. 1, X(t−) and X(t+) indicate the value of a parameter X right before and right after time t, i.e., t− and t+, respectively.

For an exemplary operation, assume EIR=300 Mbps and EBS=21 KB on a 10 Gbps line with the following:

| EBS (KB) | EBS (bits) | Burst time @10G | EIR | EIR output during EBS | Total Burst in bits | Total burst in KB |
|---|---|---|---|---|---|---|
| 21 | 168000 | 0.0000168 | 300000000 | 5040 | 173040 | 21.63 |

So on the 10 Gbps line, a single interval with a burst of 173040@ the line rate will use all of available metering tokens. Now consider traffic is sent as follows:

| Interval | Traffic | Action |
|---|---|---|
| START (T0) | 173040 | All tokens get utilized. (Traffic was sent for 0.0000168) |
| Second Int. (T40) | No Traffic | METERING TOKENS will get wasted due to EBS overflow. |
| Third Int. (T41) | 173040 | All tokens get utilized. (Traffic was sent for 0.0000168) |
| Fourth Int. (T42) | 173040 | 168000 bits will be dropped since tokens are 5040 (EIR * Burst Time) |

However, if it were possible to use the unused tokens of the second interval (T40), more bits could be sent at fourth interval instead of just 5040 which is the EIR output during burst time/interval. There are unused tokens in second interval since for 40 periodic burst time of "0.0000168," packets are not sent, thus in this interval there are (EIR*40*0.0000168) bits but out of these, only 168000 bits are kept, wasting the remaining 33600 bits (201600−168000). The systems and methods make use of unutilized tokens to help in accommodating traffic burst better within metering limits. Note, the bucket size could be increased to accommodate traffic bursts, but this leads to non-optimal utilization of tokens.

Again, with the metering algorithm defined in RFC 4115, it is possible that a lot of tokens get wasted when traffic has the CFI bit set as 1 and is bursty in nature. To explain the shortcoming of RFC 4115, another example is described as follows with the following—only yellow busty traffic is coming and metering mode is color-aware, the replenishing rate for the tokens is 1 millisecond thus 1000 times tokens will get replenished, EIR is 16 Mbps which implies for each cycle of 1 millisecond that 2000 bytes are replenished, and EBS is 4 KB (=4000 bytes). The following table illustrates the example over time.

| 1 Millisecond Cycles | Current EBS tokens | Burst Received in Bytes | Replenished Tokens | Overflow of tokens (thus unutilized) | Remaining Token in Bucket | Bytes Dropped |
|---|---|---|---|---|---|---|
| START | 4000 Bytes | 2000 Bytes | 0 | 0 | 2000 Bytes | 0 |
| 1st Cycle | 2000 Bytes | 0 Bytes | 2000 Bytes | 0 | 4000 Bytes | 0 |
| 2nd Cycle | 4000 Bytes | 0 Bytes | 2000 Bytes | 2000 Bytes | 4000 Bytes | 0 |
| 3$^{rd}$ Cycle | 4000 Bytes | 4000 Bytes | 2000 Bytes | 0 | 2000 Bytes | 0 |
| 4th Cycle- $T_o$[1] | 2000 Bytes | 3000 Bytes | 0 Bytes | 0 | 0 Bytes | 1000 Bytes |
| 4th Cycle | 0 Bytes | 0 Bytes | 2000 Bytes | 0 | 2000 Bytes | 0 |

[1]$T_o$ is some delta time before completion of the 4$^{th}$ Cycle when tokens will get replenished.

In the table above, 2000 bytes are not utilized in the second cycle which otherwise could be used for the 1000 bytes dropped at some time before completion of 4$^{th}$ Cycle. Note, by utilizing those 2000 bytes, neither the EIR rate nor EBS is negated.

Figure 2:
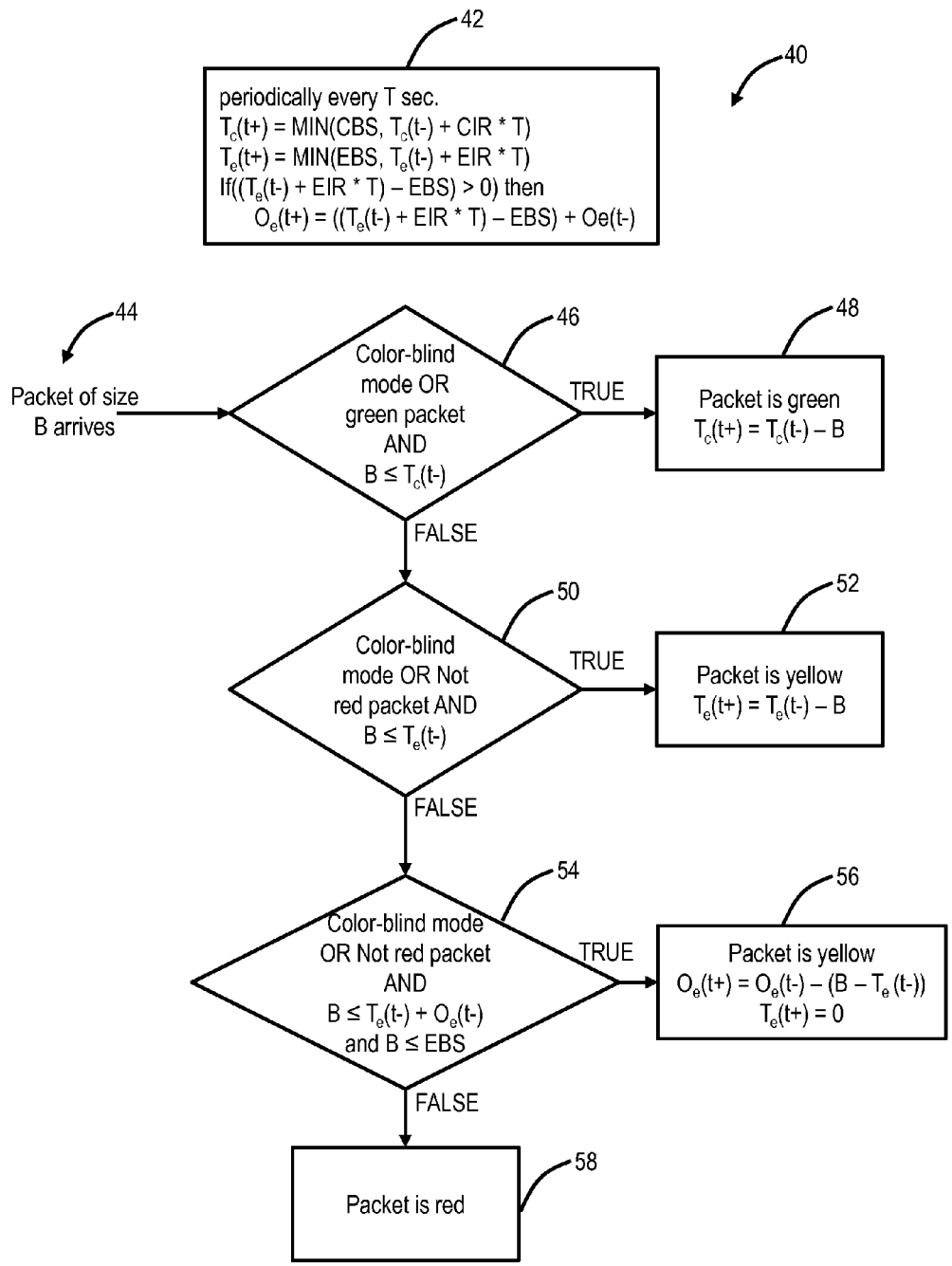
FIG. 2 is a flowchart of a packet metering/marking process which preserves use of unused yellow (EIR) tokens.

Referring to FIG. 2, in an exemplary embodiment, a flow chart illustrates a packet metering/marking process 40 which preserves the use of unused yellow (EIR) tokens. The token buckets C and E (Committed and Excess, respectively, and C=Green and E=Yellow) are initially (at time 0) full; i.e., the token count $T_c(0)$=CBS and $T_e(0)$=EBS. Thereafter, the token count $T_c$ is incremented by one CIR times per second (up to CBS), and the token count $T_e$ is incremented by one EIR times per second (up to EBS). In addition, the process 40 has an overflow counter to count tokens overflowed from EBS bucket. The overflow counter is initially (at time 0) empty, i.e., the token count $O_e(0)$=0. Thereafter, the overflow counter $O_e$ is incremented periodically every T sec such that If $(((T_e(t-) + EIR*T) - EBS) > 0)$ $\{O_e(t+) = ((T_e(t-) + EIR*T) - EBS) + O_e(t-)\}$ Again, in X(t−) and X(t+), t− and t+ indicates the value of a parameter X right before and right after time t, respectively. The overflow counter is used to 1) preserve unused EIR or yellow tokens while 2) ensuring the EIR rate or EBS is maintained.

In the color-aware operation, it is assumed that the algorithm can recognize the color of the incoming packet (green, yellow, or red). The color-aware operation of the metering/marking process 40 is described as follows. When a green packet of size B arrives at time t, then if $T_c(t)-B \geq 0$, the packet is green, and $T_c(t)$ is decremented by B; else if $T_e(t)-B \geq 0$, the packet is yellow, and $T_e(t)$ is decremented by B; else if $((T_e(t)+O_e(t))-B \geq 0)$ AND (EBS$\geq$B), the packet is yellow, and $O_e(t)$ is decremented by $(B-T_e(t))$ and the value of $T_e(t)$ is made 0; else the packet is red. When a yellow packet of size B arrives at time t, then if $_{Te}(t)-B>0$, the packet is yellow, and $T_e(t)$ is decremented by B; else if $((T_e(t)+O_e(t))-B \geq 0)$ AND (EBS$\geq$B), the packet is yellow, and $O_e(t)$ is decremented by $(B-T_e(t))$ and the value of Te(t) is made 0; else the packet is red. Note, EBS$\geq$B ensures the packet size is not greater than the allowed EBS. Incoming red packets are not tested against any of the two token buckets and remain red.

Full operation of the metering/marking process 40 is described in FIG. 2, i.e., for both color-aware and color-blind modes. In FIG. 2, X(t−) and X(t+) indicate the value of a parameter X right before and right after time t and (EBS$\geq$B) indicates that packet size is not greater than allowed Excess Burst Size. For the metering/marking process 40, periodically every T sec.

$T_c(t+) = MIN(CBS, T_c(t-)+CIR*T)$ $T_e(t+) = MIN(EBS, T_e(t-)+EIR*T)$

If $((T_e(t-)+EIR*T)-EBS)>0)$ then $O_e(t+) = ((T_e(t-)+EIR*T)-EBS)+O_e(t-)$ to set associated token buckets, $T_c$ and $T_e$, and the overflow counter, $O_e$, for a particular interval, T (step 42). This sets the committed token bucket, $T_c$, equal to either the CBS or the previous committed token bucket plus the CIR for the interval T, whichever is smaller. This sets the excess token bucket, $T_e$, equal either the EBS or the previous excess bucket plus the EIR for the interval T, whichever is smaller. Additionally, the overflow counter, $O_e$, is incremented for the interval T only if the previous excess token bucket, $T_e(t-)$ plus the EIR for the interval T is not greater than the EBS. This ensures the EBS is not exceeded with the use of the overflow counter, $O_e$. Finally, the overflow counter, $O_e$, for the interval T is set to the previous overflow counter, $O_e(t-)$, plus a portion of the previous excess token bucket, $T_e(t-)$. This portion is determined as $(T_e(t-)+EIR*T)-EBS$, which ensures the extra excess tokens in this interval T does not negate EIR or EBS.

Now, an exemplary operation of the metering/marking process 40 is described upon the arrival of a packet of size B at a meter (step 44). The metering/marking process 40 checks if the meter is operating in a color-blind mode OR the arriving packet is a green packet AND B$\leq T_c(t-)$ (step 46). If step 46 is true, the packet is green and $T_c(t+)=T_c(t-)-B$ (step 48). If step 46 is false, the metering/marking process 40 checks if the meter is operating in a color-blind mode OR the arriving packet is not a red packet AND B$\leq T_e(t-)$ (step 50). If step 50 is true, the packet is yellow and $T_e(t+)=T_e(t)-B$ (step 52). If step 50 is false, the metering/marking process 40 checks if the meter is operating in a color-blind mode OR the arriving packet is not red packet AND B$\leq T_e(t)+O_e(t)$ and B$\leq$EBS (step 54). Step 54 provides a second opportunity to tag the arriving packet as yellow, instead of setting the packet is red if the step 50 is false (as is done in the process 10). This second opportunity will only mark the arriving packet as yellow, based on the overflow counter and only if EIR and EBS are maintained. If step 56 is true, the packet is yellow, $O_e(t+)=O_e(t)-(B-T_e(t-))$, and $T_e(t+)=0$ (step 56). Finally, if step 56 is false, the packet is red.

The metering/marking process 40 adds the overflow counter to utilize yellow tokens which were earlier (i.e., in previous intervals) wasted. The metering/marking process 40 is now described with reference to the example above to depict better utilization of yellow tokens. Again, for example, EIR=300 Mbps and BS=21 KBP on a 10 G line then the following:

| EBS (KB) | EBS (bits) | Burst time @10G | EIR | EIR output during EBS | Total Burst in bits | Total burst in KB |
|---|---|---|---|---|---|---|
| 21 | 168000 | 0.0000168 | 300000000 | 5040 | 173040 | 21.63 |

So on the 10 G line single interval a burst of 173040@ the line rate will use all of available metering tokens. Now consider that traffic is sent as follows:

| Interval | Traffic | Action |
|---|---|---|
| START (T0) | 173040 | All tokens get utilized. (Traffic was sent for 0.0000168) |
| Second Int. (T40) | No Traffic | No Traffic SAVE overflowed METERING TOKENS. |
| Third Int. (T41) | 173040 | All tokens get utilized. (Traffic was sent for 0.0000168) |
| Fourth Int. (T42) | 173040 | 168000 bits will be dropped since tokens are 5040 (EIR * Burst Time), but excess 33600 bits can be accommodated |

As shown above, there are unused tokens in the second interval since for 40 periodic burst time of "0.0000168," packets are not sent, thus in this interval there are (EIR*40*0.0000168) bits. Now, instead of wasting overflowed bits, those bits are stored in the overflow counter. Thus out of a total of 201600 bits, 168000 will be accommodated in EBS while the remaining 33600 bits will get stored in the overflow counter. Now, into the Fourth Interval (T41), there are a spare 33600 bits which would be used in addition to 5040 bits. The metering/marking process 40 increases throughput through optimum utilization of yellow tokens such that neither the metering limit (EIR) nor the bucket boundary (EBS) are negated. In a nutshell, the metering/marking process 40 adds one counter which will contain only overflowed tokens of EBS bucket to optimize yellow token utilization.

In an exemplary embodiment, the metering/marking process 40 operates on a meter, device, node, etc. supporting RFC 4115. In another exemplary embodiment, the metering/marking process 40 operates on a meter, device, node, etc. supporting Metro Ethernet Forum (MEF) Technical Specification (TS) 10.2 Ethernet Services Attributes Phase 2 (October 2009), the contents of which are incorporated by reference. For example, the metering/marking process 40 can modify the Standard Bandwidth Profile Parameters and Algorithm described in Sec. 7.11.1 of MEF 10.2.

Figure 3:
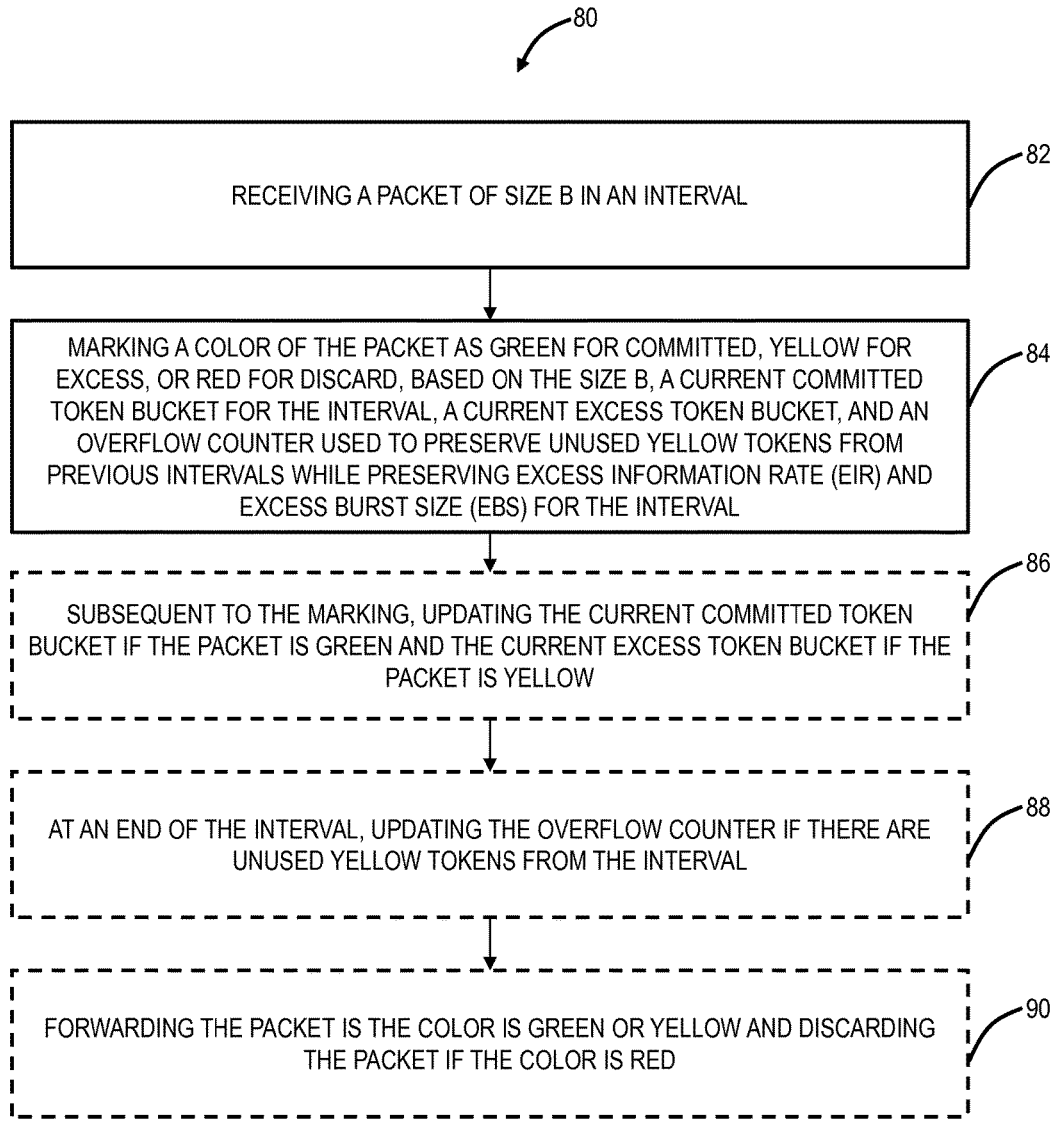
FIG. 3 is a flowchart of a packet metering process, implemented in a meter, to optimize utilization of yellow tokens.

Referring to FIG. 3, in an exemplary embodiment, a flowchart illustrates a packet metering process 80, implemented in a meter, to optimize utilization of yellow tokens. The packet metering process 80 includes receiving a packet of size B in an interval (step 82); and marking a color of the packet as green for committed, yellow for excess, or red for discard, based on the size B, a current committed token bucket for the interval, a current excess token bucket, and an overflow counter used to preserve unused yellow tokens from previous intervals while preserving Excess Information Rate (EIR) and Excess Burst Size (EBS) for the interval (step 84). The packet metering process 80 can further include, subsequent to the marking, updating the current committed token bucket if the packet is green and the current excess token bucket if the packet is yellow (step 86). The packet metering process 80 can further include, at an end of the interval, updating the overflow counter if there are unused yellow tokens from the interval (step 88). The packet metering process 80 can further include forwarding the packet is the color is green or yellow and discarding the packet if the color is red (step 90).

The meter can operate in a color-aware mode, and the marking step 84 can include, when the packet is a green packet at time t, then if the current committed token bucket minus B is greater than 0, marking the packet as green, and decrementing the current committed token bucket by B; else if the current excess token bucket minus B is greater than or equal to 0, marking the packet as yellow, and decrementing the current excess token bucket by B; else if the current excess token bucket plus the overflow counter is greater than B and if the EBS is greater than or equal to B, marking the packet as yellow and decrementing the overflow counter by B minus the current excess token bucket and the current excess token bucket is set to 0; else marking the packet as red; and when the packet is a yellow packet at time t, then if the current excess token bucket minus B is greater than 0, marking the packet as yellow, and decrementing the current excess token bucket by B; else if the current excess token bucket plus the overflow counter is greater than B and if the EBS is greater than or equal to B, marking the packet as yellow and decrementing the overflow counter by B minus the current excess token bucket and the current excess token bucket is set to 0; else marking the packet as red. The receiving step 82 and the marking step 84 can be performed pursuant to Request for Comments (RFC) 4115 (July 2005) or Metro Ethernet Forum (MEF) Technical Specification (TS) 10.2 Ethernet Services Attributes Phase 2 (October 2009).

The meter can operate in one of a color-aware mode and a color-blind mode, and wherein the marking step 84 can include, if operating in the color-blind mode OR the packet is received as green AND B is less than or equal to the current committed token bucket, marking the packet as green, and decrementing the current committed token bucket by B; if operating in the color-blind mode OR the packet is received as NOT red AND B is less than or equal to the current excess token bucket, marking the packet as yellow, and decrementing the current excess token bucket by B; and if operating in the color-blind mode OR the packet is received as NOT red AND B is less than or equal to the current excess token bucket plus the overflow counter AND B is less than or equal to the EBS, marking the packet as yellow, decrementing the overflow counter by B minus the current excess token bucket, and setting the current excess token bucket to zero.

In another exemplary embodiment, a packet metering circuit configured to optimize utilization of yellow tokens includes circuitry configured to receive a packet of size B in an interval; and a meter, implemented in circuitry, configured to mark a color of the packet as green for committed, yellow for excess, or red for discard, based on the size B, a current committed token bucket for the interval, a current excess token bucket, and an overflow counter used to preserve unused yellow tokens from previous intervals while preserving Excess Information Rate (EIR) and Excess Burst Size (EBS) for the interval.

In yet another exemplary embodiment, a packet switch configured to optimize utilization of yellow tokens includes one more line ports; and a meter configured to, responsive to receipt of a packet of size B in an interval, mark a color of the packet as green for committed, yellow for excess, or red for discard, based on the size B, a current committed token bucket for the interval, a current excess token bucket, and an overflow counter used to preserve unused yellow tokens from previous intervals while preserving Excess Information Rate (EIR) and Excess Burst Size (EBS) for the interval.

Figure 4:
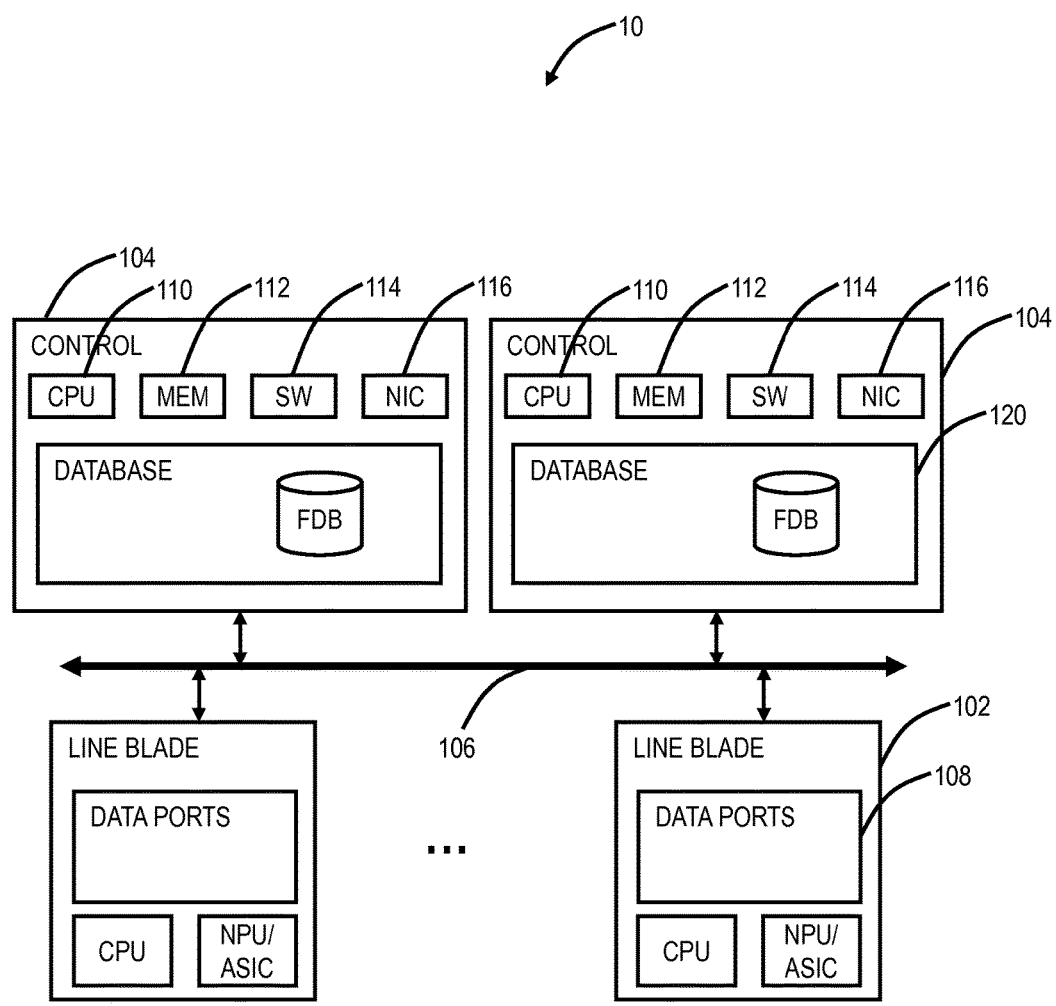
FIG. 4 is a block diagram of an exemplary implementation of a node.

Referring to FIG. 4, in an exemplary embodiment, a block diagram illustrates an exemplary implementation of a node 100. In this exemplary embodiment, the node 100 is an Ethernet network switch, but those of ordinary skill in the art will recognize the systems and methods described herein can operate with other types of network elements and other implementations. In this exemplary embodiment, the node 100 includes a plurality of blades 102, 104 interconnected via an interface 106. The blades 102, 104 are also known as line cards, line modules, circuit packs, pluggable modules, etc. and refer generally to components mounted on a chassis, shelf, etc. of a data switching device, i.e., the node 100. Each of the blades 102, 104 can include numerous electronic devices and optical devices mounted on a circuit board along with various interconnects including interfaces to the chassis, shelf, etc.

Two exemplary blades are illustrated with line blades 102 and control blades 104. The line blades 102 include data ports 108 such as a plurality of Ethernet ports. For example, the line blade 102 can include a plurality of physical ports disposed on an exterior of the blade 102 for receiving ingress/egress connections. Additionally, the line blades 102 can include switching components to form a switching fabric via the interface 106 between all of the data ports 108 allowing data traffic to be switched between the data ports 108 on the various line blades 102. The switching fabric is a combination of hardware, software, firmware, etc. that moves data coming into the node 100 out by the correct port 108 to the next node 100. "Switching fabric" includes switching units, or individual boxes, in a node; integrated circuits contained in the switching units; and programming that allows switching paths to be controlled. Note, the switching fabric can be distributed on the blades 102, 104, in a separate blade (not shown), or a combination thereof. The line blades 102 can include an Ethernet manager (i.e., a processor) and a Network Processor (NP)/Application Specific Integrated Circuit (ASIC).

The control blades 104 include a microprocessor 110, memory 112, software 114, and a network interface 116. Specifically, the microprocessor 110, the memory 112, and the software 114 can collectively control, configure, provision, monitor, etc. the node 100. The network interface 116 may be utilized to communicate with an element manager, a network management system, etc. Additionally, the control blades 104 can include a database 120 that tracks and maintains provisioning, configuration, operational data and the like. The database 120 can include a forwarding database (FDB) that may be populated as described herein (e.g., via the user triggered approach or the asynchronous approach). In this exemplary embodiment, the node 100 includes two control blades 104 which may operate in a redundant or protected configuration such as 1:1, 1+1, etc. In general, the control blades 104 maintain dynamic system information including Layer two forwarding databases, protocol state machines, and the operational status of the ports 108 within the node 100.

Figure 5:
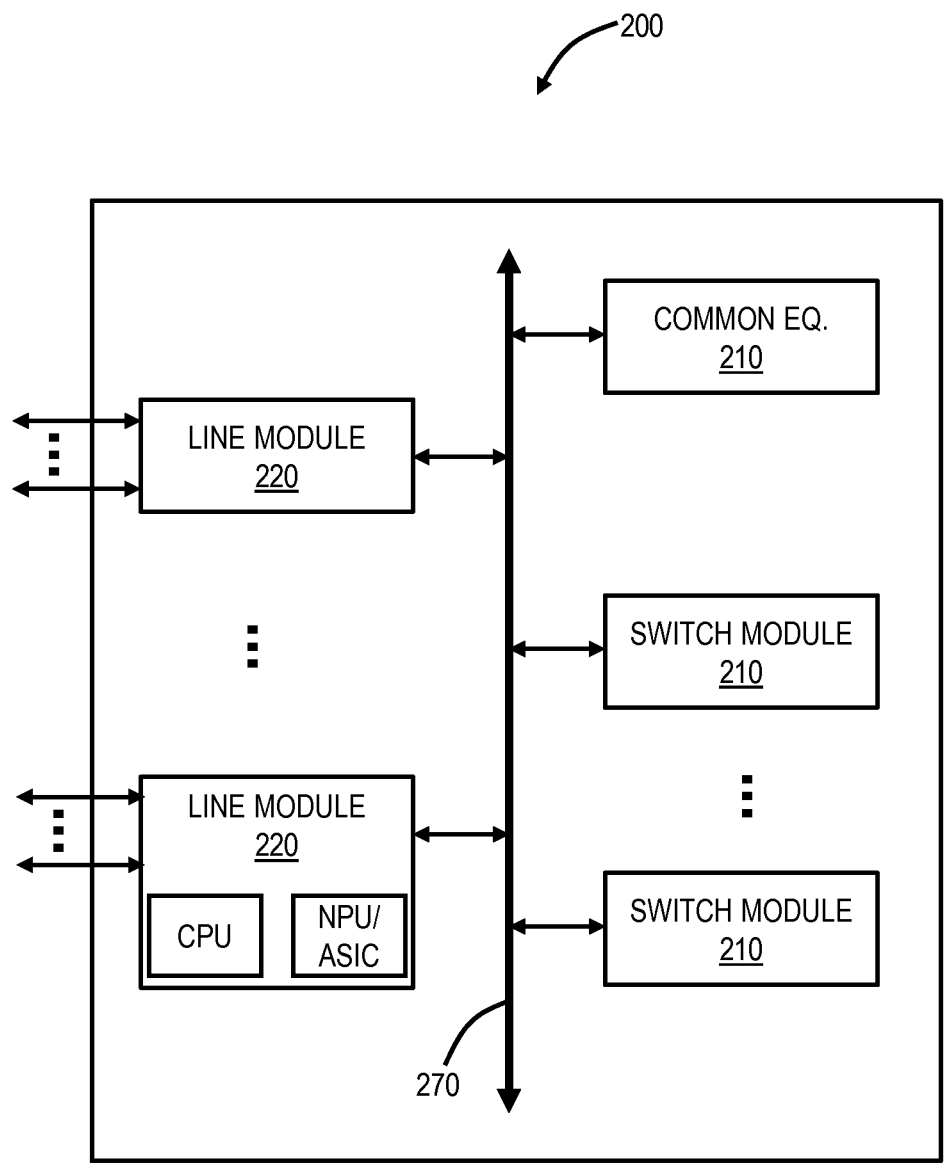
FIG. 5 is a block diagram of another exemplary implementation of a node.

Referring to FIG. 5, in an exemplary embodiment, a block diagram illustrates another exemplary implementation of a node 200. For example, the node 100 can be a dedicated switch whereas the node 200 can be a multiservice platform. In an exemplary embodiment, the node 200 can be a nodal device that may consolidate the functionality of a multi-service provisioning platform (MSPP), digital cross connect (DCS), Ethernet and Optical Transport Network (OTN) switch, dense wave division multiplexed (DWDM) platform, etc. into a single, high-capacity intelligent switching system providing Layer 0, 1, and 2 consolidation. In another exemplary embodiment, the node 200 can be any of an add/drop multiplexer (ADM), a multi-service provisioning platform (MSPP), a digital cross-connect (DCS), an optical cross-connect, an optical switch, a router, a switch, a WDM terminal, an access/aggregation device, etc. That is, the node 200 can be any system with ingress and egress signals and switching of packets, channels, timeslots, tributary units, wavelengths, etc. In the context of the systems and methods described herein, the node 200 includes packet switching with metering in addition to any other functionality.

In an exemplary embodiment, the node 200 includes common equipment 210, one or more line modules 220, and one or more switch modules 230. The common equipment 210 can include power; a control module; operations, administration, maintenance, and provisioning (OAM&P) access; and the like. The common equipment 210 can connect to a management system such as a network management system (NMS), element management system (EMS), or the like. The node 200 can include an interface 270 for communicatively coupling the common equipment 210, the line modules 220, and the switch modules 230 together. For example, the interface 270 can be a backplane, midplane, a bus, optical or electrical connectors, or the like. The line modules 220 are configured to provide ingress and egress to the switch modules 230 and external to the node 200. In an exemplary embodiment, the line modules 220 can form ingress and egress switches with the switch modules 230 as center stage switches for a three-stage switch, e.g., a three-stage Clos switch.

The line modules 220 can include a plurality of connections per module and each module may include a flexible rate and protocol support for any type of connection, such as, for example, 155 Mb/s, 622 Mb/s, 1 Gb/s, 2.5 Gb/s, 10 Gb/s, 40 Gb/s, 100 Gb/s, etc. The line modules 220 can include wavelength division multiplexing interfaces, short reach interfaces, and the like, and can connect to other line modules 220 on remote network elements, end clients, routers, switches, and the like. From a logical perspective, the line modules 220 provide ingress and egress ports to the node 200, and each line module 220 can include one or more physical ports. The switch modules 230 are configured to switch channels, timeslots, tributary units, wavelengths, etc. between the line modules 220. For example, the switch modules 230 can provide wavelength granularity (Layer 0 switching), SONET/SDH granularity; OTN granularity such as Optical Channel Data Unit-k (ODUk) Optical Channel Data Unit-flex (ODUflex), Optical channel Payload Virtual Containers (OPVCs), etc.; Ethernet granularity; and the like. Specifically, the switch modules 230 can include both Time Division Multiplexed (TDM) (i.e., circuit switching) and packet switching engines. The switch modules 230 can include redundancy as well, such as 1:1, 1:N, etc.

In context of the systems and methods described herein, the node 100 includes packet metering which can be performed by one or more meters, implemented in circuitry and located on the line blade 102, the control blade 104, in the switching fabric at some point, etc. Similar to the node 100, the node 200 includes packet switching through the line modules 220 and/or the switch modules 230. The node 200 includes packet metering which can be performed by one or more meters, implemented in circuitry and located on the line modules 220, the switch modules 230, the common equipment 210, etc. Specifically, the metering/marking process 40 can be implemented in circuitry, logic, hardware, firmware, software, and/or a combination thereof in the nodes 100, 200. Those of ordinary skill in the art will recognize the nodes 100, 200 can include other components that are omitted for illustration purposes, and that the systems and methods described herein contemplate using a plurality of different nodes with the nodes 100, 200 presented as an exemplary type of node. For example, in another exemplary embodiment, a node may not include the switch modules 230, but rather have the corresponding functionality in the line modules 220 (or some equivalent) in a distributed fashion. For the nodes 100, 200, other architectures providing ingress, egress, and switching are also contemplated for the systems and methods described herein. In general, the systems and methods described herein contemplate use with any node providing packet switching with metering.

Further, it will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A packet metering method, implemented in a meter, to optimize utilization of yellow tokens, the packet metering method comprising:
   receiving a packet of size B in an interval; and
   marking a color of the packet as green for committed, yellow for excess, or red for discard, based on the size B, a current committed token bucket for the interval, a current excess token bucket, and an overflow counter used to preserve unused yellow tokens from previous intervals while preserving Excess Information Rate (EIR) and Excess Burst Size (EBS) for the interval;
   wherein the meter operates in a color-aware mode, and wherein the marking comprises:
   when the packet is a green packet at time t, then
      if the current committed token bucket minus B is greater than 0, marking the packet as green, and decrementing the current committed token bucket by B; else
      if the current excess token bucket minus B is greater than or equal to 0, marking the packet as yellow, and decrementing the current excess token bucket by B; else
      if the current excess token bucket plus the overflow counter is greater than B and if the EBS is greater than or equal to B, marking the packet as yellow and decrementing the overflow counter by B minus the current excess token bucket and the current excess token bucket is set to 0; else
      marking the packet as red;
   when the packet is a yellow packet at time t, then
      if the current excess token bucket minus B is greater than 0, marking the packet as yellow, and decrementing the current excess token bucket by B; else
      if the current excess token bucket plus the overflow counter is greater than B and if the EBS is greater than or equal to B, marking the packet as yellow and decrementing the overflow counter by B minus the current excess token bucket and the current excess token bucket is set to 0; else
      marking the packet as red.

2. The packet metering method of claim 1, further comprising:
   subsequent to the marking, updating the current committed token bucket if the packet is green and the current excess token bucket if the packet is yellow.

3. The packet metering method of claim 1, further comprising:
   at an end of the interval, updating the overflow counter if there are unused yellow tokens from the interval.

4. The packet metering method of claim 1, wherein the meter is operating in one of a color-aware mode and a color-blind mode, and wherein the marking comprises:
   if operating in the color-blind mode OR the packet is received as green AND B is less than or equal to the current committed token bucket, marking the packet as green, and decrementing the current committed token bucket by B;
   if operating in the color-blind mode OR the packet is received as NOT red AND B is less than or equal to the current excess token bucket, marking the packet as yellow, and decrementing the current excess token bucket by B; and if operating in the color-blind mode OR the packet is received as NOT red AND B is less than or equal to the current excess token bucket plus the overflow counter AND B is less than or equal to the EBS, marking the packet as yellow, decrementing the overflow counter by B minus the current excess token bucket, and setting the current excess token bucket to zero.

5. The packet metering method of claim 1, further comprising:
forwarding the packet is the color is green or yellow and discarding the packet if the color is red.

6. The packet metering method of claim 1, wherein the receiving and the marking is performed pursuant to Request for Comments (RFC) 4115 (July 2005).

7. The packet metering method of claim 1, wherein the receiving and the marking is performed pursuant to Metro Ethernet Forum (MEF) Technical Specification (TS) 10.2 Ethernet Services Attributes Phase 2 (October 2009).

8. A packet metering circuit configured to optimize utilization of yellow tokens, the packet metering circuit comprising:
circuitry configured to receive a packet of size B in an interval; and
a meter, implemented in circuitry, configured to mark a color of the packet as green for committed, yellow for excess, or red for discard, based on the size B, a current committed token bucket for the interval, a current excess token bucket, and an overflow counter used to preserve unused yellow tokens from previous intervals while preserving Excess Information Rate (EIR) and Excess Burst Size (EBS) for the interval;
wherein the meter operates in a color-aware mode, and wherein the meter is configured to
when the packet is a green packet at time t, then
if the current committed token bucket minus B is greater than 0, mark the packet as green, and decrement the current committed token bucket by B; else
if the current excess token bucket minus B is greater than or equal to 0, mark the packet as yellow, and decrement the current excess token bucket by B; else
if the current excess token bucket plus the overflow counter is greater than B and if the EBS is greater than or equal to B, mark the packet as yellow and decrement the overflow counter by B minus the current excess token bucket and the current excess token bucket is set to 0; else
mark the packet as red;
when the packet is a yellow packet at time t, then
if the current excess token bucket minus B is greater than 0, mark the packet as yellow, and decrement the current excess token bucket by B; else
if the current excess token bucket plus the overflow counter is greater than B and if the EBS is greater than or equal to B, mark the packet as yellow and decrement the overflow counter by B minus the current excess token bucket and the current excess token bucket is set to 0; else
mark the packet as red.

9. The packet metering circuit of claim 8, wherein the meter is further configured to, subsequent to the packet being marked, update the current committed token bucket if the packet is green and the current excess token bucket if the packet is yellow.

10. The packet metering circuit of claim 8, wherein the meter is further configured to, at an end of the interval, update the overflow counter if there are unused yellow tokens from the interval.

11. The packet metering circuit of claim 8, wherein the meter is operating in one of a color-aware mode and a color-blind mode, and wherein the meter is configured to
if operating in the color-blind mode OR the packet is received as green AND B is less than or equal to the current committed token bucket, mark the packet as green, and decrement the current committed token bucket by B;
if operating in the color-blind mode OR the packet is received as NOT red AND B is less than or equal to the current excess token bucket, mark the packet as yellow, and decrement the current excess token bucket by B; and
if operating in the color-blind mode OR the packet is received as NOT red AND B is less than or equal to the current excess token bucket plus the overflow counter AND B is less than or equal to the EBS, mark the packet as yellow, decrement the overflow counter by B minus the current excess token bucket, and set the current excess token bucket to zero.

12. The packet metering circuit of claim 8, further comprising:
forwarding circuitry configured to forward the packet if the color is green or yellow and discard the packet if the color is red.

13. The packet metering circuit of claim 8, wherein the meter operates pursuant to Request for Comments (RFC) 4115 (July 2005).

14. The packet metering circuit of claim 8, wherein the meter operates pursuant to Metro Ethernet Forum (MEF) Technical Specification (TS) 10.2 Ethernet Services Attributes Phase 2 (October 2009).

15. A packet switch configured to optimize utilization of yellow tokens, the packet switch comprising:
one or more line ports; and
a meter configured to, responsive to receipt of a packet of size B in an interval, mark a color of the packet as green for committed, yellow for excess, or red for discard, based on the size B, a current committed token bucket for the interval, a current excess token bucket, and an overflow counter used to preserve unused yellow tokens from previous intervals while preserving Excess Information Rate (EIR) and Excess Burst Size (EBS) for the interval;
wherein the meter operates in a color-aware mode, and wherein the meter is configured to
when the packet is a green packet at time t, then
if the current committed token bucket minus B is greater than 0, mark the packet as green, and decrement the current committed token bucket by B; else
if the current excess token bucket minus B is greater than or equal to 0, mark the packet as yellow, and decrement the current excess token bucket by B; else
if the current excess token bucket plus the overflow counter is greater than B and if the EBS is greater than or equal to B, mark the packet as yellow and decrement the overflow counter by B minus the current excess token bucket and the current excess token bucket is set to 0; else
mark the packet as red;
when the packet is a yellow packet at time t, then
if the current excess token bucket minus B is greater than 0, mark the packet as yellow, and decrement the current excess token bucket by B; else
if the current excess token bucket plus the overflow counter is greater than B and if the EBS is greater than or equal to B, mark the packet as yellow and decrement the overflow counter by B minus the current excess token bucket and the current excess token bucket is set to 0; else mark the packet as red.

16. The packet switch of claim 15, wherein the meter is configured to subsequent to the packet being marked, update the current committed token bucket if the packet is green and the current excess token bucket if the packet is yellow, and at an end of the interval, update the overflow counter if there are unused yellow tokens from the interval.

17. The packet switch of claim 15, wherein the meter is operating in one of a color-aware mode and a color-blind mode, and wherein the meter is configured to if operating in the color-blind mode OR the packet is received as green AND B is less than or equal to the current committed token bucket, mark the packet as green, and decrement the current committed token bucket by B;

if operating in the color-blind mode OR the packet is received as NOT red AND B is less than or equal to the current excess token bucket, mark the packet as yellow, and decrement the current excess token bucket by B; and if operating in the color-blind mode OR the packet is received as NOT red AND B is less than or equal to the current excess token bucket plus the overflow counter AND B is less than or equal to the EBS, mark the packet as yellow, decrement the overflow counter by B minus the current excess token bucket, and set the current excess token bucket to zero.

* * * * *